United States Patent
Yao

(10) Patent No.: US 8,476,347 B1
(45) Date of Patent: Jul. 2, 2013

(54) RESIN COMPOUND, RESIN COMPOSITION, AND RESIN-MOLDED ARTICLE

(75) Inventor: Kenji Yao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/485,087

(22) Filed: May 31, 2012

(30) Foreign Application Priority Data

Dec. 26, 2011 (JP) .................. 2011-282872

(51) Int. Cl.
*C08K 5/523* (2006.01)
(52) U.S. Cl.
USPC ......................................... 524/127
(58) Field of Classification Search
USPC ......................................... 524/127
See application file for complete search history.

(56) References Cited

FOREIGN PATENT DOCUMENTS

| JP | A-2009-173887 | 8/2009 |
|---|---|---|
| JP | A-2010-202847 | 9/2010 |
| JP | A-2011-032432 | 2/2011 |

*Primary Examiner* — Peter Szekely
(74) *Attorney, Agent, or Firm* — Oliff & Berridge, PLC.

(57) ABSTRACT

A resin compound includes a reaction product of (A) polymer which is at least selected from aliphatic polyester and aliphatic polyamide and (B) an aromatic compound with a compositional ratio from 0.1 to 10 parts by weight with respect to 100 parts by weight of (A) and represented by the following Formula (1):

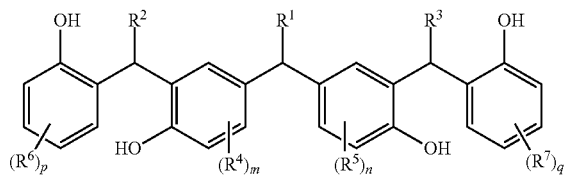

wherein each of $R^1$, $R^2$, and $R^3$ represents a hydrogen atom, a substituted or unsubstituted alkyl group having 1 to 6 carbon atoms, or a substituted or unsubstituted aromatic group having 6 to 10 carbon atoms; each of $R^4$, $R^5$, $R^6$, and $R^7$ represents a substituted or unsubstituted alkyl group having 1 to 6 carbon atoms or a substituted or unsubstituted aromatic group having 6 to 10 carbon atoms; each dm and n independently represents an integer from 0 to 3; and each of p and q represents an integer from 0 to 4.

14 Claims, 2 Drawing Sheets

RESIN COMPOUND, RESIN COMPOSITION, AND RESIN-MOLDED ARTICLE

CROSS-REFERENCE TO RELATED APPLICATIONS

This application is based on and claims priority under 35 USC 119 from Japanese Patent Application No. 2011-282872 filed Dec. 26, 2011.

BACKGROUND

1. Technical Field

The present invention relates to a resin compound, a resin composition, and a resin-molded article.

2. Related Art

In the related art, various resin compositions have been provided and used for various purposes. Particularly, the resin compositions are being used for various parts, chassis, and the like of home appliances or vehicles, and for parts of the chassis of office equipment or electronic and electric instruments.

SUMMARY

That is, according to an aspect of the invention, there is provided a resin compound containing a reaction product of (A) polymer which is at least selected from aliphatic polyester and aliphatic polyimide and (B) an aromatic compound of which a compositional ratio is from 0.1 part by weight to 10 parts by weight with respect to 100 parts by weight of the Component (A) and which is represented by the following Formula (1).

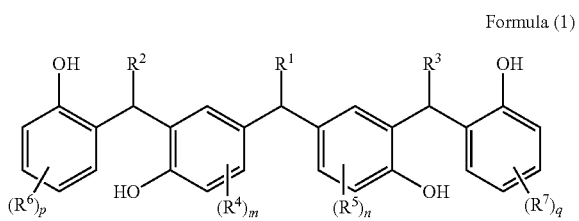

Formula (1)

In Formula (1), each of $R^1$, $R^2$, and $R^3$ independently represents a hydrogen atom, a substituted or unsubstituted alkyl group having from 1 to 6 carbon atoms, or a substituted or unsubstituted aromatic group having from 6 to 10 carbon atoms; each of $R^4$, $R^5$, $R^6$, and $R^7$ independently represents a substituted or unsubstituted alkyl group having from 1 to 6 carbon atoms or a substituted or unsubstituted aromatic group having from 6 to 10 carbon atoms; each of m and n independently represents an integer of from 0 to 3; and each of p and q independently represents an integer of from 0 to 4.

BRIEF DESCRIPTION OF THE DRAWINGS

Exemplary embodiments of the present invention will be described in detail based on the following figures, wherein.

DETAILED DESCRIPTION

Figure 1:
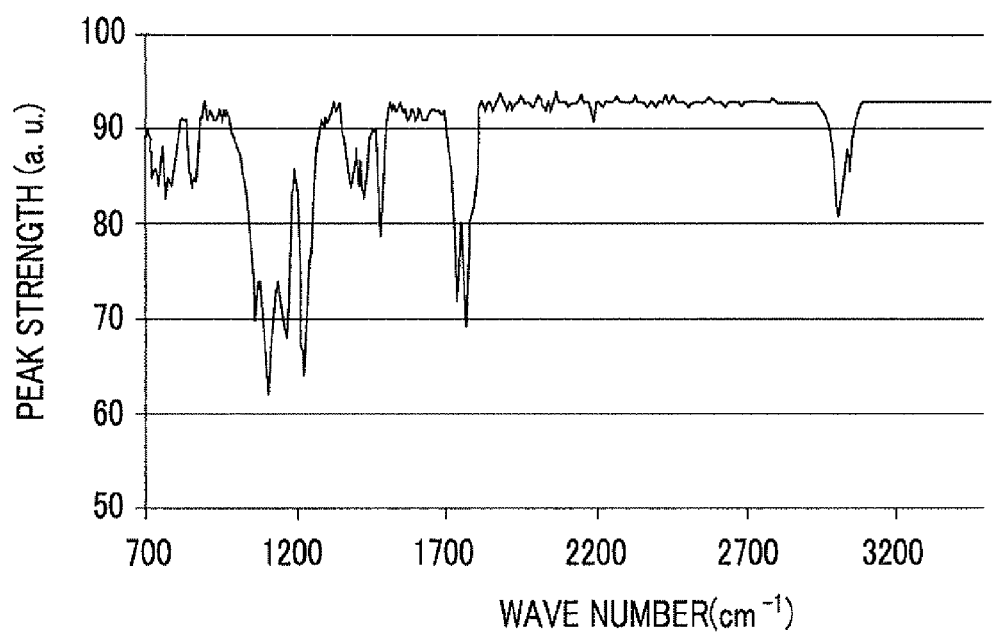
FIG. 1 is a view showing an absorption spectrum of a resin compound obtained in Example 1.

Hereinbelow, exemplary embodiments as an example of the resin compound, the resin composition, and the resin-molded article of the present invention will be described.

Resin Compound

The resin compound according to the present exemplary embodiment is a resin compound containing a reaction product in which (A) aliphatic polyester and/or aliphatic polyimide is bonded to an aromatic compound represented by the following Formula (1) in a compositional ratio in which the ratio of the aromatic compound is from 0.1 part by weight to 10 parts by weight with respect to 100 parts by weight of the (A).

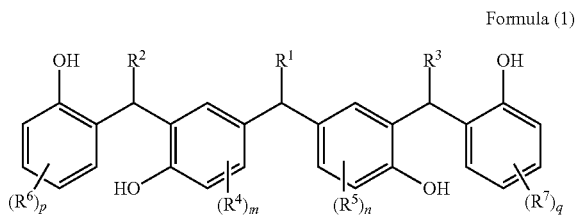

Formula (1)

In Formula (1), each of $R^1$, $R^2$, and $R^3$ independently represents a hydrogen atom, a substituted or unsubstituted alkyl group having from 1 to 6 carbon atoms, or a substituted or unsubstituted aromatic group having from 6 to 10 carbon atoms; each of $R^4$, $R^5$, $R^6$, and $R^7$ independently represents a substituted or unsubstituted alkyl group having from 1 to 6 carbon atoms or a substituted or unsubstituted aromatic group having from 6 to 10 carbon atoms; each of m and n independently represents an integer of from 0 to 3; and each of p and q independently represents an integer of from 0 to 4.

With the resin compound according to the present exemplary embodiment, a resin compound having photoconductivity is obtained by the above constitution.

Though unclear, the reason is considered to be as below.

It is considered that the aromatic compound forms a covalent bond with a carboxy group or an amino group at the end of aromatic polyester or aromatic polyamide molecules, using 4 hydroxy groups in Formula (1). It is considered that due to the formation of this bond, a structural unit derived from the aromatic compound and a structural unit derived from the aliphatic polyester or the aliphatic polyamide form a cross-linking structure. It is considered that in this cross-linking structure, the structural unit derived from the aliphatic compound and the structural unit derived from the aliphatic polyester or the aliphatic polyamide are randomly distributed.

Incidentally, it is known that between molecules of aromatic compounds, photoconductivity is expressed by the movement (hereinbelow, also referred to as "hopping") of electrons between π electron clouds of a benzene ring. It is considered that it is important for an intermolecular distance between aromatic compounds to be in an appropriate range so as not to attenuate the hopping.

It is considered that in the resin compound according to the present exemplary embodiment, since the cross-linking structure is formed, the structural units derived from the aromatic compound represented by Formula (1) are randomly distributed at an appropriate distance, and consequently, the resin compound expresses photoconductivity.

It is also considered that in the aromatic compound, the 4 benzene rings in Formula (1) are connected to each other by a single bond via 1 carbon atom, so a structure in which the whole molecule is easily bent is formed.

It is considered that in the resin compound according to the present exemplary embodiment, an easily bent structural unit derived from the aromatic compound and a structural unit derived from the aliphatic polyester or the aliphatic polyamide form a random cross-linking structure. Consequently, it is considered that the resin compound according to the present exemplary embodiment shows excellent flexibility after being molded.

The resin compound according to the present exemplary embodiment is a reaction product in which (A) the aliphatic polyester and/or the aliphatic polyamide is bonded to the aromatic compound in a compositional ratio in which the ratio of the aromatic compound is from 0.1 part by weight to 10 parts by weight with respect to 100 parts by weight of the (A).

Since the ratio of the aromatic compound is from 0.1 part by weight to 10 parts by weight with respect to 100 parts by weight of the (A), a resin compound having photoconductivity is obtained.

In addition, since the ratio of the aromatic compound is 10 parts by weight or less with respect to 100 parts by weight of the (A), the proportion of the structural unit derived from the (A) in the resin compound does not become too small. In addition to this, due to the original flexibility of the aliphatic polyester and the aliphatic polyamide, a resin compound showing excellent mechanical strength after being molded is obtained.

For these two reasons, in the compositional ratio, the ratio of the aromatic compound is desirably from 0.2 part by weight to 5 parts by weight based on 100 parts by weight of the (A).

In the resin compound according to the present exemplary embodiment, a state where the aliphatic polyester or the aliphatic polyamide has been bonded to the aromatic compound is identified by measuring an infrared absorption spectrum. Specifically, when peaks are observed near 700 cm$^{-1}$ to 740 cm$^{-1}$ and near 2800 cm$^{-1}$ to 3000 cm$^{-1}$ by the infrared absorption spectrum measurement, the bond is identified to be formed.

In the resin compound according to the present exemplary embodiment, the compositional ratio (weight ratio) between (A) the aliphatic polyester and/or the aliphatic polyamide and (B) the aromatic compound is identified by measuring an infrared absorption spectrum and calculating a ratio between a peak derived from the aliphatic polyester and the aliphatic polyamide and a peak derived from the aromatic compound.

In addition, whether the resin compound according to the present exemplary embodiment is contained in a resin composition or a resin-molded article is detected by, for example, measuring an infrared absorption spectrum or a proton NMR spectrum.

Whether the resin compound according to the present exemplary embodiment expresses photoconductivity is confirmed by the following procedure. First, a solution in which the resin compound has been dissolved is cast on a 20 mm×20 mm glass plate so as to form a thin film. The central portion of the film is covered with a copper wire having a width of 0.3 mm, and gold is vapor-deposited on the film, thereby preparing a thin film of the resin compound in which gold electrodes are formed at a gap of 0.3 mm. This film is irradiated with light having a wavelength of from 400 nm to 3000 nm by laser spectroscopy, and the flowing currents are measured by a tester.

Aliphatic Polyester

The aliphatic polyester is not particularly limited, and examples thereof include a hydroxycarboxylic acid polymer, a polycondensate of an aliphatic diol and an aliphatic carboxylic acid, and the like.

Specific examples of the aliphatic polyester include poly-lactic acid, poly-3-hydroxybutyrate, polyhydroxyhexanoate, polyhydroxyvalerate, and a copolymer of these; polybutylene succinate, polybutylene adipate, polyethylene succinate, polyethylene adipate, and a copolymer of these; and the like.

These aliphatic polyesters may be used alone, or two or more kinds thereof may be used concurrently.

Among these, as the aliphatic polyester, polylactic acid, polyhydroxybutyrate, polybutylene succinate, and a copolymer of two or more kinds of these are desirable, and polylactic acid is more desirable for being combined with the aromatic compound.

The aliphatic polyester may be a single aliphatic polyester (for example, polyhydroxybutyrate), or an L-isomer and a D-isomer as optical isomers of polylactic acid may be mixed as the aliphatic polyester. Moreover, these may be copolymerized with each other.

Though not particularly limited, the weight-average molecular weight of the aliphatic polyester is desirably from 8000 to 150000, and more desirably from 20000 to 100000.

The weight-average molecular weight is a value measured by using a gel permeation chromatography instrument (manufactured by Shimadzu Corporation, Prominence GPC model) and using a Shim-pack GPC-80M measurement column. The same method will be applied below.

Aliphatic Polyamide

The aliphatic polyamide is not particularly limited, and examples thereof include polyhydroxyamine, a polycondensate of an aliphatic amine and an aliphatic diol, and the like.

Specific examples of the aliphatic polyamide include polyamide 4-6, polyamide 6, polyamide 6-6, polyamide 6-10, polyamide 6-12, polyamide 6-13, polyamide 6-14, polyamide 6-15, polyamide 6-16, polyamide 9-10, polyamide 9-12, polyamide 9-13, polyamide 9-14, polyamide 9-15, polyamide 9-36, polyamide 10-6, polyamide 10-10, polyamide 10-12, polyamide 10-13, polyamide 10-14, polyamide 11, polyamide 12, polyamide 12-10, polyamide 12-12, polyamide 12-13, polyamide 12-14, and the like.

These aliphatic polyamides may be used alone, or two or more kinds thereof may be used concurrently.

Among these, as the aliphatic polyamide, polyamide 11 is desirable for being combined with the aromatic compound.

Though not particularly limited, the weight-average molecular weight of an aliphatic polyamide resin is desirably from 5000 to 200000, and more desirably from 10000 to 150000.

Aromatic Compound Represented by Formula (1)

The aromatic compound is an aromatic compound represented by the following Formula (1).

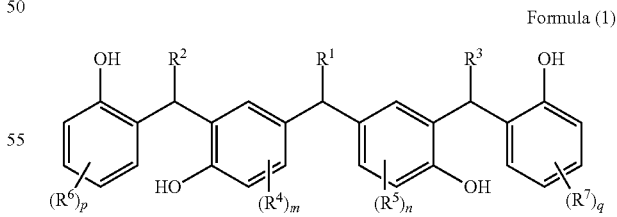

Formula (1)

In Formula (1), each of $R^1$, $R^2$, and $R^3$ independently represents a hydrogen atom, a substituted or unsubstituted alkyl group having from 1 to 6 carbon atoms, or a substituted or unsubstituted aromatic group having from 6 to 10 carbon atoms; each of $R^4$, $R^5$, $R^6$, and $R^7$ independently represents a substituted or unsubstituted alkyl group having from 1 to 6 carbon atoms or a substituted or unsubstituted aromatic group having from 6 to 10 carbon atoms; each of m and n independently represents an integer of from 0 to 3; and each of p and q independently represents an integer of from 0 to 4.

When m is 2 or greater, the $R^4$s may be the same as or different from each other. When n is 2 or greater, the $R^5$s may be the same as or different from each other. When p is 2 or greater, the $R^6$s may be the same as or different from each other. When q is 2 or greater, the $R^7$s may be the same as or different from each other.

Examples of alkyl groups having from 1 to 6 carbon atoms that are represented by $R^1$, $R^2$, and $R^3$ include a methyl group, an ethyl group, an n-propyl group, an isopropyl group, an n-butyl group, an isobutyl group, a sec-butyl group, a tert-butyl group, a pentyl group, a hexyl group, and the like.

When the alkyl groups represented by $R^1$, $R^2$, and $R^3$ are substituted, examples of the substituent include a halogen atom (for example, fluorine, chlorine, bromine, or iodine) and the like.

The alkyl groups represented by $R^1$, $R^2$, and $R^3$ are desirably unsubstituted in the respect that a resin compound showing superior photoconductivity is obtained.

The aromatic groups having from 6 to 10 carbon atoms that are represented by $R^1$, $R^2$, and $R^3$ may be benzenoid groups or nonbenzenoid groups, and examples thereof include groups obtained by removing 1 hydrogen atom from benzene, naphthalene, or azulene, and the like.

When the aromatic groups represented by $R^1$, $R^2$, and $R^3$ are substituted, examples of the substituent include an alkyl group having from 1 to 12 carbon atoms, an alkenyl group having from 2 to 12 carbon atoms, a halogen atom (for example, fluorine, chlorine, bromine, or iodine), and the like.

The aromatic groups represented by $R^1$, $R^2$, and $R^3$ are desirably unsubstituted in the respect that a resin compound showing superior photoconductivity is obtained.

In Formula (1), each of $R^1$, $R^2$, and $R^3$ desirably independently represents a substituted or unsubstituted alkyl group having from 1 to 6 carbon atoms, more desirably independently represents an unsubstituted alkyl group having from 1 to 3 carbon atoms, and even more desirably independently represents a methyl group.

Examples of the alkyl groups having from 1 to 6 carbon atoms that are represented by $R^4$, $R^5$, $R^6$, and $R^7$ include a methyl group, an ethyl group, an n-propyl group, an isopropyl group, an n-butyl group, an isobutyl group, a sec-butyl group, a tert-butyl group, a pentyl group, a hexyl group, and the like.

When the alkyl groups represented by $R^4$, $R^5$, $R^6$, and $R^7$ are substituted, examples of the substituent include a halogen atom (for example, fluorine, chlorine, bromine, or iodine) and the like.

The alkyl groups represented by $R^4$, $R^5$, $R^6$, and $R^7$ are desirably unsubstituted in the respect that a resin compound showing superior photoconductivity is obtained.

The aromatic groups having from 6 to 10 carbon atoms that are represented by $R^4$, $R^5$, $R^6$, and $R^7$ may be benzenoid groups or nonbenzenoid groups, and examples thereof include groups obtained by removing 1 hydrogen atom from benzene, naphthalene, or azulene, and the like.

When the aromatic groups represented by $R^4$, $R^5$, $R^6$, and $R^7$ are substituted, examples of the substituent include an alkyl group having from 1 to 12 carbon atoms, an alkenyl group having from 2 to 12 carbon atoms, a halogen atom (for example, fluorine, chlorine, bromine, or iodine) and the like.

The aromatic groups represented by $R^4$, $R^5$, $R^6$, and $R^7$ are desirably unsubstituted in the respect that a resin compound showing superior photoconductivity is obtained.

In Formula (1), each of $R^4$, $R^5$, $R^6$, and $R^7$ desirably independently represents a substituted or unsubstituted alkyl group having from 1 to 6 carbon atoms, more desirably independently represents an unsubstituted alkyl group having from 1 to 3 carbon atoms, and even more desirably independently represents a methyl group.

In Formula (1), each of m and n independently represents an integer of from 0 to 3. Both m and n are desirably 0 or 1 in the respect that a resin compound showing superior photoconductivity is obtained.

In Formula (1), each of p and q independently represents an integer of from 0 to 4. Both p and q are desirably an integer of from 0 to 2 in the respect that a resin compound showing superior photoconductivity is obtained.

In Formula (1), when m and n are 1, $R^4$ and $R^5$ are desirably positioned in an ortho-position of a hydroxy group.

In Formula (1), when p and q are 1, $R^6$ and $R^7$ are desirably positioned in a para-position of a hydroxy group. When p and q are 2, $R^6$ and $R^7$ are desirably positioned in an ortho-position and a para-position of a hydroxy group.

The aromatic compound is desirably an aromatic compound represented by Formula (1) in which each of $R^1$, $R^2$, and $R^3$ independently represents a substituted or unsubstituted alkyl group having from 1 to 6 carbon atoms; each of m, n, p, and q independently represents an integer of 1 or greater (each of m and n independently represents an integer of from 1 to 3, and each of p and q independently represents an integer of from 1 to 4); and each of at least one of the $R^4$s, at least one of the $R^5$s, at least one of the $R^6$s, and at least one of the $R^7$s independently represents a substituted or unsubstituted alkyl group having from 1 to 6 carbon atoms, in the respect that a resin-molded article showing excellent mechanical strength is obtained. The aromatic compound is more desirably an aromatic compound represented by Formula (1) in which each of $R^1$, $R^2$, and $R^3$ independently represents an unsubstituted alkyl group having from 1 to 3 carbon atoms; both m and n represent 1; both p and q represent 1 or 2; and each of $R^4$, $R^5$, $R^6$, and $R^7$ independently represents an unsubstituted alkyl group having from 1 to 3 carbon atoms.

Specific examples of the aromatic compound include the following compounds.

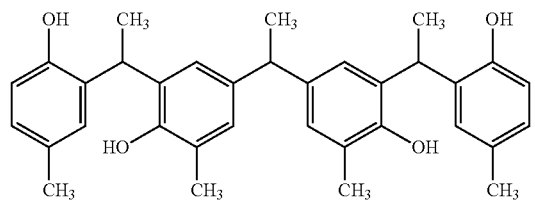

Example Compound (1)

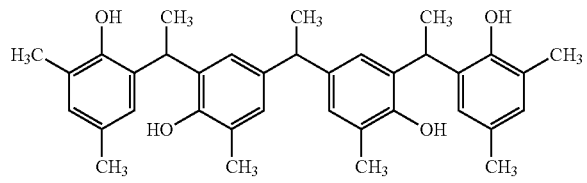

Example Compound (2)

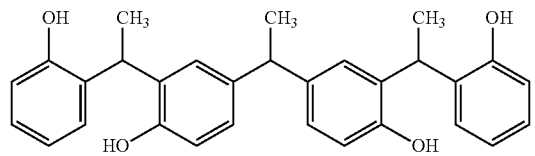

Example Compound (3)

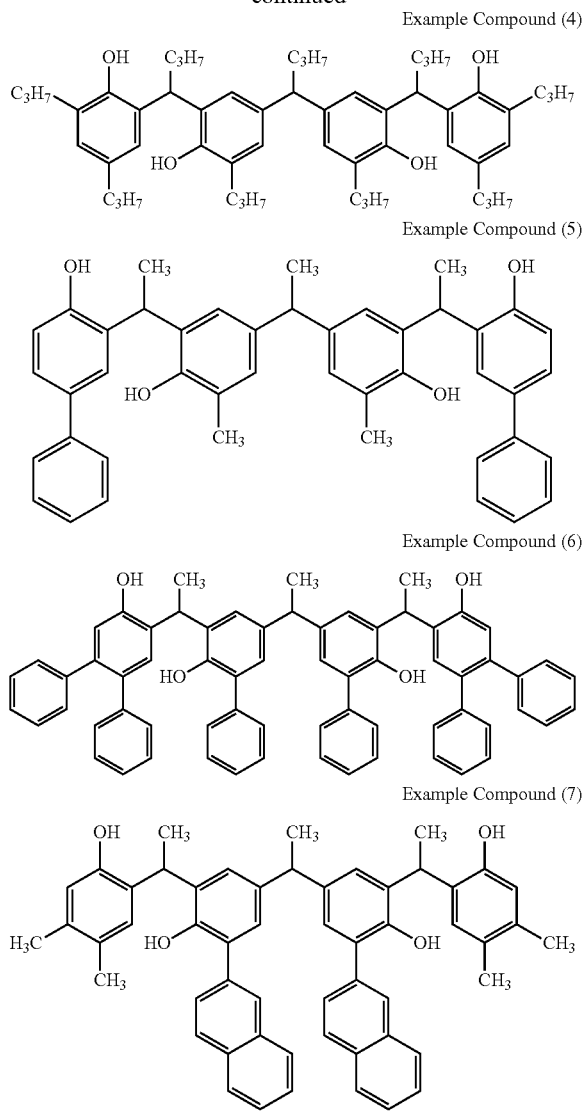

Among the Example Compounds (1) to (7), Example Compounds (1) to (4) are desirable as the aromatic compound in the respect that a resin compound showing superior photoconductivity is obtained. In addition, Example Compounds (1), (2), and (4) are desirable in the respect that a resin compound showing excellent mechanical strength after being molded is obtained.

The aromatic compound represented by Formula (1) is synthesized by known phenol derivative synthesis methods.

Method of Preparing Resin Compound

The resin compound according to the present exemplary embodiment is prepared by, for example, melting and kneading a mixture of the aliphatic polyester and/or the aliphatic polyamide and the aromatic compound.

Known methods are exemplified as the method of melting and kneading, and specific examples thereof include methods using a twin-screw extruder, a Henschel mixer, a Banbury mixer, a single-screw extruder, a multi-screw extruder, a co-kneader, and the like.

Resin Composition

The resin composition according to the present exemplary embodiment contains the resin compound according to the present exemplary embodiment.

With the resin composition according to the present exemplary embodiment, a resin composition having photoconductivity after being molded is provided by the above composition.

The resin composition according to the present exemplary embodiment contains the resin compound according to the present exemplary embodiment and optionally further contains a condensed phosphoric acid ester.

With the resin composition according to the present exemplary embodiment, due to the above composition, a resin composition showing superior mechanical strength after being molded is obtained, compared to a case where the resin composition contains a flame retardant which is not a condensed phosphoric acid ester among flame retardants known in the related art. Though unclear, the reason is considered to be as below.

It is considered that in the resin compound according to the present exemplary embodiment, the aliphatic polyester and/or the aliphatic polyimide and the aromatic compound form the cross-linking structure described above, and that in the inside of the resin compound molecule and between the resin compound molecules, there is a gap that the condensed phosphoric acid ester enters. It is also considered that the condensed phosphoric acid ester enters the gap, thereby being distributed throughout the entire resin composition. Consequently, it is considered that the resin composition according to the present exemplary embodiment maintains the original flexibility of the resin compound and obtains mechanical strength after being molded.

In addition, it is considered that the resin compound according to the present exemplary embodiment obtains flame retardancy since the compound contains the condensed phosphoric acid ester.

Condensed Phosphoric Acid Ester

Examples of the condensed phosphoric acid ester include aromatic condensed phosphoric acid esters of a bisphenol A type, a biphenylene type, an isophthalic type, and the like. Specific examples thereof include condensed phosphoric acid esters represented by the following Formulae (A) and (B).

Formula (A)

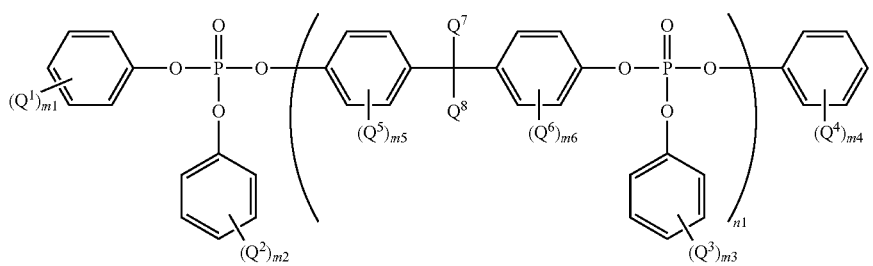

Formula (B)

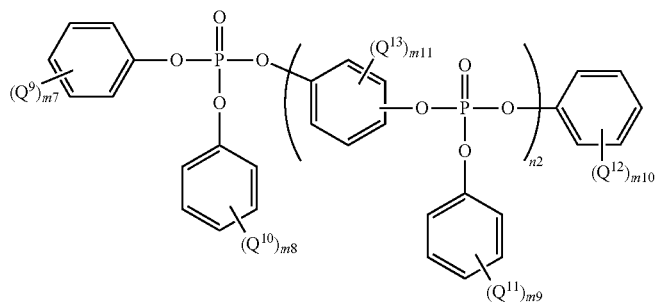

In Formula (A), each of $Q^1$, $Q^2$, $Q^3$, and $Q^4$ independently represents a hydrogen atom or an alkyl group having from 1 to 6 carbon atoms; each of $Q^5$, $Q^6$, $Q^7$, and $Q^8$ independently represents a hydrogen atom or a methyl group; each of m1, m2, m3, and m4 independently represents an integer of from 0 to 3; each of m5 and m6 independently represents an integer of from 0 to 2; and n1 represents an integer of from 0 to 10.

In Formula (B), each of $Q^9$, $Q^{10}$, $Q^{11}$, and $Q^{12}$ independently represents a hydrogen atom or an alkyl group having from 1 to 6 carbon atoms; $Q^{13}$ represents a hydrogen atom or a methyl group; each of m7, m8, m9, and m10 independently represents an integer of from 0 to 3; m11 represents an integer of from 0 to 4; and n2 represents an integer of from 0 to 10.

The condensed phosphoric acid ester may be a synthetic product or a commercially available product. Examples of the commercially available product of the condensed phosphoric acid ester include "PX200", "PX201", "PX202", and "CR741" which are commercially available products manufactured by DAIHACHI CHEMICAL INDUSTRY CO., LTD., "ADEKA STAB FP2100" and "ADEKA STAB FP2200" which are commercially available products manufactured by ADEKA CORPORATION, and the like.

Among these, the condensed phosphoric acid ester is desirably at least one kind selected from a compound represented by the following Structural Formula (C) ("PX200" manufactured by DAIHACHI CHEMICAL INDUSTRY CO., LTD.) and a compound represented by the following Structural Formula (D) ("CR741" manufactured by DAIHACHI CHEMICAL INDUSTRY CO., LTD.), in the respect that the mechanical strength and the flame retardancy are markedly exhibited after molding when the above compound is combined with the resin compound contained in the resin composition.

Structural Formula (C)

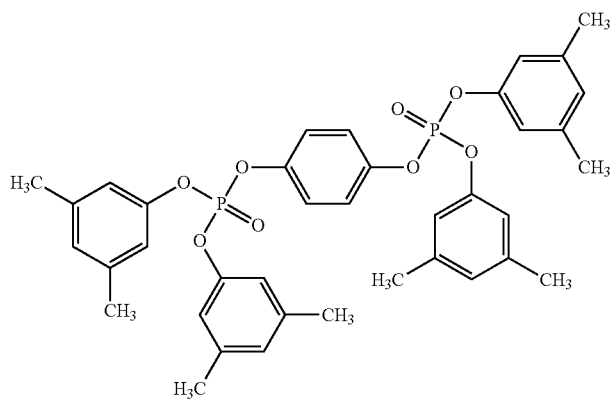

Structural Formula (D)

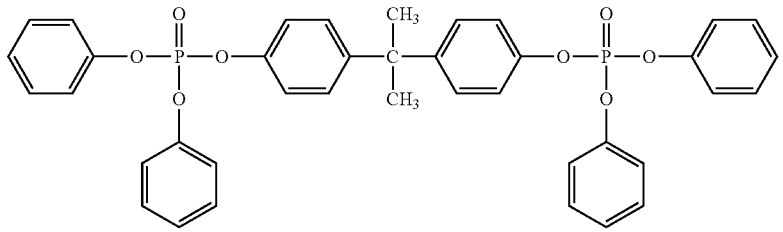

The amount of the condensed phosphoric acid ester contained is desirably from 5% by weight to 30% by weight, and more desirably from 10% by weight to 15% by weight, based on the total amount of the aliphatic polyester and the aliphatic polyamide constituting the resin compound contained in the resin composition. If the amount of the condensed phosphoric acid ester contained is 5% by weight or more, the flame retardancy of the obtained resin-molded article becomes superior. On the other hand, if the amount of the condensed phosphoric acid ester contained is 30% by weight or less, the mechanical strength of the obtained resin-molded article becomes superior.

Other Components

The resin composition according to the present exemplary embodiment may contain other components if necessary. The amount of other components contained is desirably from 0% by weight to 10% by weight, and more desirably from 0% by weight to 5% by weight, based on the entire resin composition. Herein, "0% by weight" means that other components are not contained.

Examples of other components include a compatibilizer, a plasticizer, an antioxidant, a release agent, a light resistance imparting agent, a weather resistance imparting agent, a flame retardant, a colorant, a pigment, a modifier, a drip preventing agent, an antistatic agent, a hydrolysis preventing agent, a filler, a reinforcing agent (such as glass fibers, carbon fibers, talc, clay, mica, glass flakes, milled glass, glass beads, crystalline silica, alumina, silicon nitride, alumina nitride, and boron nitride), and the like.

The resin composition according to the present exemplary embodiment may contain a resin other than the aliphatic polyester and the aliphatic polyamide. Here, the other resin is mixed within a range that does not deteriorate moldability in a molding machine.

Examples of the other resin include thermoplastic resins known in the related art. Specific examples thereof include a polycarbonate resin; a polypropylene resin; an aromatic polyester resin; a polyolefin resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyether ketone resin; a polyether ether ketone resin; a polyaryl ketone resin; a polyether nitrile resin; a liquid crystal resin; a polybenzimidazole resin; a polyparabanic acid resin; a vinyl-based polymer or copolymer resin obtained by polymerizing or copolymerizing one or more kinds of vinyl monomers selected from a group consisting of an aromatic alkenyl compound, methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenyl maleimide copolymer resin; a vinyl cyanide-(ethylene-diene-propylene (EPDM))-aromatic alkenyl compound copolymer resin; polyolefin; a vinyl chloride resin; a chlorinated vinyl chloride resin; and the like.

These resins may be used alone, or two or more kinds thereof may be used concurrently.

Method of Preparing Resin Composition

The resin composition according to the present exemplary embodiment is prepared by, for example, melting and kneading a mixture including the above respective components.

Known methods are exemplified as the method of melting and kneading, and specific examples thereof include methods using a twin-screw extruder, a Henschel mixer, a Banbury mixer, a single-screw extruder, a multi-screw extruder, a co-kneader, and the like.

Resin-Molded Article

The resin-molded article according to the present exemplary embodiment is constituted with the resin compound or the resin composition according to the present exemplary embodiment. That is, the resin-molded article according to the present exemplary embodiment is constituted with the same composition as that of the resin compound or the resin composition according to the present exemplary embodiment.

Specifically, the resin-molded article according to the present exemplary embodiment is obtained by molding the resin compound or the resin composition according to the present exemplary embodiment. For the molding method, for example, injection molding, extrusion molding, blow molding, heat press molding, calendar molding, coating molding, cast molding, dipping molding, vacuum molding, transfer molding, and the like may be applied.

It is considered that in the resin-molded article according to the present exemplary embodiment, the aliphatic polyester and/or the aliphatic polyamide and the aromatic compound form the cross-linking structure in the resin compound and the resin composition as the material. Consequently, the resin compound and the resin composition as the material have thermoplasticity, and accordingly, molding is obtained by injection molding. The resin-molded article according to the present exemplary embodiment is arbitrarily shaped by injection molding.

The injection molding may be performed using, for example, commercially available devices such as a NEX150 and a NEX70000 manufactured by Nissei Plastic Industrial Co., Ltd. and an SE50D manufactured by TOSHIBA MACHINE CO., LTD.

At this time, the cylinder temperature is desirably from 170° C. to 280° C., and more desirably from 180° C. to 270° C. In addition, the mold temperature is desirably from 40° C. to 110° C., and more desirably from 50° C. to 110° C.

The resin-molded article according to the present exemplary embodiment is used for a photoconductor of an image forming apparatus that forms an image by transferring the image formed on the photoconductor to a transfer material or used for a secondary cell (a storage cell) for photovoltaic generation and the like.

EXAMPLES

Hereinbelow, the present invention will be described in detail based on examples, but the present invention is not limited to the examples.

Examples 1 to 22 and Comparative Examples 1 to 8

Preparation of Resin Compound

Materials are mixed in the compositional ratios shown in Tables 1 and 2 (the numerical values in Tables 1 and 2 are based on part (s) by weight) and kneaded using a twin-screw extruder (manufactured by TOSHIBA MACHINE CO., LTD., TEM3000) at a cylinder temperature as the kneading temperature (° C.) shown in Tables 1 and 2, followed by cooling and pelletizing, thereby obtaining pellets of the resin compound.

TABLE 1

| Compound No. | Aliphatic polyester Polylactic acid TERRAMAC TE2000 | Aliphatic polyester Polylactic acid 3051D | Polyhydroxy-butyrate Biopol D400G | Aliphatic polyamide Polyamide 11 Rilsan | Aromatic compound Example Compound (1) | Aromatic compound Example Compound (2) | Aromatic compound Example Compound (3) | Aromatic compound Example Compound (4) | Kneading temperature [° C.] |
|---|---|---|---|---|---|---|---|---|---|
| Example 1 | 1 | 100 | — | — | — | 2 | — | — | — | 185 |
| Example 2 | 2 | 100 | — | — | — | — | 2 | — | — | 185 |
| Example 3 | 3 | 100 | — | — | — | — | — | 2 | — | 185 |
| Example 4 | 4 | 100 | — | — | — | — | — | — | 2 | 185 |
| Example 5 | 5 | 100 | — | — | — | 0.1 | — | — | — | 180 |
| Example 6 | 6 | 100 | — | — | — | 0.5 | — | — | — | 180 |
| Example 7 | 7 | 100 | — | — | — | 5 | — | — | — | 190 |
| Example 8 | 8 | 100 | — | — | — | 10 | — | — | — | 190 |
| Example 9 | 9 | — | 100 | — | — | 2 | — | — | — | 185 |
| Example 10 | 10 | — | 100 | — | — | — | 2 | — | — | 185 |
| Example 11 | 11 | — | — | 100 | — | 2 | — | — | — | 165 |
| Example 12 | 12 | — | — | 100 | — | — | 2 | — | — | 165 |
| Example 13 | 13 | — | — | 100 | — | — | — | 2 | — | 165 |
| Example 14 | 14 | — | — | 100 | — | — | — | — | 2 | 165 |
| Example 15 | 15 | — | — | — | 100 | 2 | — | — | — | 210 |
| Example 16 | 16 | — | — | — | 100 | — | 2 | — | — | 210 |
| Example 17 | 17 | — | — | — | 100 | — | — | 2 | — | 210 |
| Example 18 | 18 | — | — | — | 100 | — | — | — | 2 | 210 |
| Example 19 | 19 | — | — | — | 100 | 0.1 | — | — | — | 200 |
| Example 20 | 20 | — | — | — | 100 | 0.5 | — | — | — | 205 |
| Example 21 | 21 | — | — | — | 100 | 5 | — | — | — | 220 |
| Example 22 | 22 | — | — | — | 100 | 10 | — | — | — | 210 |
| Comparative Example 1 | C1 | 100 | — | — | — | — | — | — | — | 180 |
| Comparative Example 2 | C2 | 100 | — | — | — | 11 | — | — | — | 190 |
| Comparative Example 3 | C3 | — | — | — | 100 | — | — | — | — | 200 |
| Comparative Example 4 | C4 | — | — | — | 100 | 11 | — | — | — | 210 |

TABLE 2

| | Compound No. | Aliphatic polyester Polylactic acid TERRAMAC TE2000 | Novolac phenol resin A | Novolac phenol resin B | Crystal nucleating agent Trimesic acid tricyclohexylamide | Crystal nucleating agent Talc | Kneading temperature [° C.] |
|---|---|---|---|---|---|---|---|
| Comparative Example 5 | C5 | 100 | 10 | — | 0.35 | — | 180 |
| Comparative Example 6 | C6 | 100 | — | 10 | 0.35 | — | 180 |
| Comparative Example 7 | C7 | 100 | 10 | — | — | 1 | 180 |
| Comparative Example 8 | C8 | 100 | 10 | — | 1 | — | 180 |

Identification of Resin Compound

For each example, an absorption spectrum is measured using an infrared absorption spectrum measuring instrument (manufactured by Shimadzu Corporation, IRAffinity-1) to identify the resin compound. As examples of the absorption spectrum, FIG. 1 shows an absorption spectrum of the resin compound according to Example 1, and FIG. 2 shows an absorption spectrum of the resin compound according to Example 15.

As shown in FIG. 1, plural peaks that are generated since the Example Compound (1) is bonded to polylactic acid are observed near 700 $cm^{-1}$ to 730 $cm^{-1}$ and near 2900 $cm^{-1}$ to 3000 $cm^{-1}$ other than the typical absorption peak of polylactic acid. From this result, it is understood that a resin compound in which the Example Compound (1) is bonded to polylactic acid is obtained. In addition, from the ratio between the peak derived from polylactic acid and the peak derived from the Example Compound (1), it is understood that a resin compound having the same compositional ratio as the mixing ratio is obtained.

Figure 2:
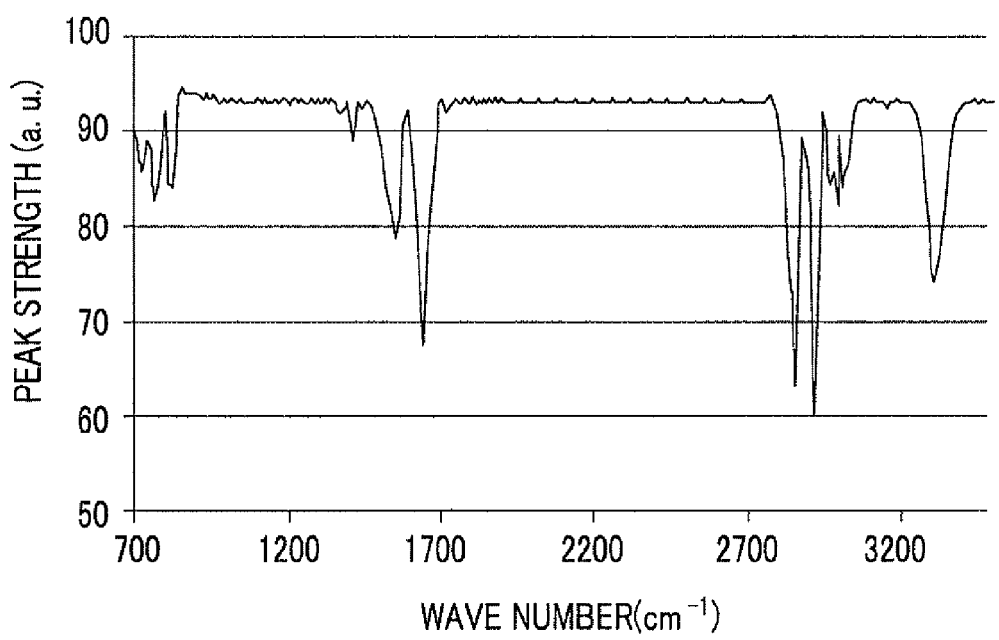
FIG. 2 is a view showing an absorption spectrum of a resin compound obtained in Example 15.

As shown in FIG. 2, plural peaks that are generated since the Example Compound (1) is bonded to polyamide 11 are observed near 710 $cm^{-1}$ to 740 $cm^{-1}$ and near 2800 $cm^{-1}$ to 3000 $cm^{-1}$ other than the typical absorption peak of the polyamide 11. From this result, it is understood that a resin compound in which the Example Compound (1) is bonded to the polyamide 11 is obtained. In addition, from the ratio between the peak derived from the polyamide 11 and the peak derived from the Example Compound (1), it is understood that a resin compound having the same compositional ratio as the mixing ratio is obtained.

Examples 101 to 111 and Comparative Examples 101 and 102

Preparation of Resin Composition

Materials are mixed in the compositional ratios shown in Tables 3 and 4 (the numerical values in Tables 3 and 4 are based on part (s) by weight) and kneaded using a twin-screw extruder (manufactured by TOSHIBA MACHINE CO., LTB., TEM3000) at a cylinder temperature as the kneading temperature (° C.) shown in Tables 3 and 4, followed by cooling and pelletizing, thereby obtaining pellets of the resin compound.

Charpy Impact Strength (Notched)

The ISO multipurpose dumbbell test piece is processed, and Charpy notched impact-resistance strength ($kJ/m^2$) is measured according to ISO 179-1 by using an impact test instrument (manufactured by Toyo Seiki Seisaku-sho, LTD., DG-5).

Volume Resistivity

Volume resistivity is measured using the D2 test piece by a 4-terminal method. In measuring the volume resistivity, a volume resistivity ($\Omega \cdot cm$) obtained when light is not irradi-

TABLE 3

| | Composition No. | Aliphatic polyester | | Aliphatic polyamide | Aromatic compound | Condensed phosphoric acid ester | Flame retardant | Kneading temperature [° C.] |
|---|---|---|---|---|---|---|---|---|
| | | Polylactic acid TERRAMAC TE2000 | Polyhydroxybutyrate Biopol D400G | Polyamide 11 Riisan | Example Compound (1) | PX200 | Exolit AP422 | |
| Example 101 | 101 | 100 | — | — | 2 | 5 | — | 180 |
| Example 102 | 102 | 100 | — | — | 2 | 10 | — | 175 |
| Example 103 | 103 | 100 | — | — | 2 | 30 | — | 170 |
| Example 104 | 104 | — | — | 100 | 2 | 5 | — | 210 |
| Example 105 | 105 | — | — | 100 | 2 | 10 | — | 200 |
| Example 106 | 106 | — | — | 100 | 2 | 30 | — | 190 |
| Example 107 | 107 | — | 100 | — | 2 | 10 | — | 170 |
| Example 108 | 108 | 100 | — | — | 2 | — | 30 | 180 |
| Example 109 | 109 | 100 | — | — | 2 | — | 10 | 180 |
| Example 110 | 110 | — | — | 100 | 2 | — | 30 | 200 |
| Example 111 | 111 | — | — | 100 | 2 | — | 10 | 200 |

TABLE 4

| | Composition No. | Aliphatic polyester Polylactic acid TERRAMAC TE2000 | Novolac phenol resin A | Crystal nucleating agent Trimesic acid tricyclohexylamide | Condensed phosphoric acidester PX200 | Kneading temperature [° C.] |
|---|---|---|---|---|---|---|
| Comparative Example 101 | C101 | 100 | 10 | 0.35 | 10 | 180 |
| Comparative Example 102 | C102 | 100 | 10 | 0.35 | 30 | 180 |

Examples 201 to 222, Comparative Examples 201 to 212, Examples 301 to 311, and Comparative Examples 301 to 304

The pellets of the resin compounds or the resin compositions obtained as above are subjected to injection molding using an injection molding machine (manufactured by Nissei Plastic Industrial Co., Ltd., NEX150) at the cylinder temperature (° C.) and the mold temperature (° C.) of the molding conditions shown in Table 5 or 6. In this manner, an ISO multipurpose dumbbell test piece (a length of a portion to be tested of 100 mm, a width of 10 mm, and a thickness of 4 mm), a UL test piece (a length of 125 mm, a width of 13 mm, and a thickness of 1.6 mm), and a D2 test piece (a length of 60 mm, a width of 60 mm, and a thickness of 2 mm) are obtained.

Evaluation

The respective test pieces obtained as above are evaluated in the following manner, and the results are shown in Tables 5 and 6.

ated and a volume resistivity ($\Omega \cdot cm$) obtained when the surface of the D2 test piece is irradiated with near infrared light from an infrared light source (manufactured by HAYASHI WATCH WORKS, LA100-IR) are measured.

Flame Retardancy

By using the UL test piece, flame retardancy is evaluated according to a V test of UL94. As the evaluation criteria, the test pieces are marked with V-0, V-1, and V-2 in order from a test piece showing superior flame retardancy, and when the flame retardancy is inferior to V-2, that is, when fire spreads on a test piece, this is marked V-Not.

Bending Rupture Elongation

By using the ISO multipurpose dumbbell test piece, bending rupture elongation (%) is measured according to ISO178 by using an Instron instrument (manufactured by Yasuda Seiki seisakusho LTD., LR10KPlus).

TABLE 5

| | Compound No. | Molding condition | | Physical property evaluation | | | | |
|---|---|---|---|---|---|---|---|---|
| | | Cylinder temperature [° C.] | Mold temperature [° C.] | Charpy impact strength [kJ/m$^2$] | Volume resistivity at the time of no light irradiation [Ω·cm] | Volume resistivity at the time of near infrared irradiation [Ω·cm] | Flame retardancy | Bending rupture elongation [%] |
| Example 201 | 1 | 185 | 30 | 7.1 | $1.56 \times 10^8$ | 510 | V-1 | 9.5 |
| Example 202 | 2 | 185 | 30 | 7.2 | $1.58 \times 10^8$ | 530 | V-1 | 10.1 |
| Example 203 | 3 | 185 | 30 | 6.4 | $14.32 \times 10^8$ | 1580 | V-1 | 3.8 |
| Example 204 | 4 | 185 | 30 | 6.2 | $21.58 \times 10^8$ | 1770 | V-1 | 9.2 |
| Example 205 | 5 | 180 | 30 | 6.0 | $22.55 \times 10^8$ | 1890 | V-1 | 9.2 |
| Example 206 | 6 | 180 | 30 | 6.5 | $2.13 \times 10^8$ | 650 | V-1 | 9.5 |
| Example 207 | 7 | 190 | 30 | 6.8 | $1.78 \times 10^8$ | 540 | V-1 | 9.4 |
| Example 208 | 8 | 190 | 30 | 7.1 | $1.45 \times 10^8$ | 490 | V-1 | 10.5 |
| Example 209 | 9 | 185 | 30 | 6.8 | $2.55 \times 10^8$ | 660 | V-1 | 9.8 |
| Example 210 | 10 | 185 | 30 | 6.6 | $2.58 \times 10^8$ | 670 | V-1 | 9.4 |
| Example 211 | 11 | 170 | 30 | 4.8 | $2.65 \times 10^8$ | 980 | V-1 | 8.5 |
| Example 212 | 12 | 170 | 30 | 4.7 | $9.58 \times 10^8$ | 1050 | V-1 | 8.7 |
| Example 213 | 13 | 170 | 30 | 4.4 | $32.54 \times 10^8$ | 2150 | V-1 | 5.5 |
| Example 214 | 14 | 170 | 30 | 4.4 | $38.56 \times 10^8$ | 2300 | V-1 | 8.6 |
| Example 215 | 15 | 210 | 60 | 10.5 | $2.15 \times 10^8$ | 750 | V-1 | 12.5 |
| Example 216 | 16 | 210 | 60 | 10.3 | $2.18 \times 10^8$ | 780 | V-1 | 12.8 |
| Example 217 | 17 | 210 | 60 | 9.8 | $10.25 \times 10^8$ | 950 | V-1 | 7.5 |
| Example 218 | 18 | 210 | 60 | 9.5 | $14.88 \times 10^8$ | 1120 | V-1 | 10.5 |
| Example 219 | 19 | 200 | 60 | 11.5 | $18.45 \times 10^8$ | 2150 | V-1 | 14.5 |
| Example 220 | 20 | 205 | 60 | 9.5 | $9.58 \times 10^8$ | 820 | V-1 | 11.6 |
| Example 221 | 21 | 220 | 60 | 9.1 | $7.95 \times 10^8$ | 790 | V-1 | 12.5 |
| Example 222 | 22 | 210 | 60 | 8.9 | $6.52 \times 10^8$ | 550 | V-1 | 10.2 |
| Comparative Example 201 | C1 | 180 | 30 | 1.7 | $1 \times 10^{15}$ or more | $1 \times 10^{15}$ or more | V-Not | 0.7 |
| Comparative Example 202 | C2 | 190 | 30 | 2.8 | $1 \times 10^{15}$ or more | $1 \times 10^{15}$ or more | V-Not | 1.2 |
| Comparative Example 203 | C3 | 200 | 60 | 12.5 | $1 \times 10^{15}$ or more | $1 \times 10^{15}$ or more | V-Not | 9.5 |
| Comparative Example 204 | C4 | 210 | 60 | 6.5 | $1 \times 10^{15}$ or more | $1 \times 10^{15}$ or more | V-Not | 7.5 |
| Comparative Example 205 | C5 | 180 | 30 | 2.8 | $1 \times 10^{15}$ or more | $1 \times 10^{15}$ or more | V-Not | 1.2 |
| Comparative Example 206 | C5 | 180 | 110 | 2.1 | $1 \times 10^{15}$ or more | $1 \times 10^{15}$ or more | V-Not | 0.4 |
| Comparative Example 207 | CS | 180 | 30 | 2.5 | $1 \times 10^{15}$ or more | $1 \times 10^{15}$ or more | V-Not | 0.5 |
| Comparative Example 208 | CS | 180 | 110 | 1,7 | $1 \times 10^{15}$ or more | $1 \times 10^{15}$ or more | V-Not | 0.4 |
| Comparative Example 209 | C7 | 180 | 30 | 2.2 | $1 \times 10^{15}$ or more | $1 \times 10^{15}$ or more | V-Not | 0.5 |
| Comparative Example 210 | C7 | 180 | 110 | 1.5 | $1 \times 10^{15}$ or more | $1 \times 10^{15}$ or more | V-Not | 0.3 |
| Comparative Example 211 | C8 | 180 | 30 | 2.0 | $1 \times 10^{15}$ or more | $1 \times 10^{15}$ or more | V-Not | 0.6 |
| Comparative Example 212 | C8 | 180 | 110 | 1.4 | $1 \times 10^{15}$ or more | $1 \times 10^{15}$ or more | V-Not | 0.4 |

From the above results, it is understood that the resin compounds according to the examples express photoconductivity. It is also understood that in similar compositions, among the resin compounds according to the examples, examples using the Example Compounds (1), (2), and (4) are superior in bending rupture elongation and show superior mechanical strength after being molded, compared to examples (Examples 203, 213, and 217) using the Example Compound (3).

TABLE 6

| | Composition No. | Molding condition | | Physical property evaluation | | | | |
|---|---|---|---|---|---|---|---|---|
| | | Cylinder temperature [° C.] | Mold temperature [° C.] | Charpy impact strength [kJ/m$^2$] | Volume resistivity at the time of no light irradiation [Ω·cm] | Volume resistivity at the time of near infrared irradiation [Ω·cm] | Flame retardancy | Bending rupture elongation [%] |
| Example 301 | 101 | 180 | 30 | 8.5 | $2.14 \times 10^8$ | 680 | V-1 | 10.5 |
| Example 302 | 102 | 175 | 30 | 8.8 | $2.25 \times 10^8$ | 690 | V-0 | 11.8 |
| Example 303 | 103 | 170 | 30 | 8.7 | $2.24 \times 10^8$ | 680 | V-0 | 12.6 |
| Example 304 | 104 | 210 | 60 | 11.5 | $3.58 \times 10^8$ | 820 | V-1 | 15.8 |
| Example 305 | 105 | 205 | 60 | 12.5 | $3.42 \times 10^8$ | 850 | V-0 | 16.9 |
| Example 306 | 106 | 200 | 60 | 11.0 | $2.89 \times 10^8$ | 830 | V-0 | 12.5 |

TABLE 6-continued

| | Composition No. | Molding condition | | Charpy impact strength [kJ/m$^2$] | Physical property evaluation | | Flame retardancy | Bending rupture elongation [%] |
|---|---|---|---|---|---|---|---|---|
| | | Cylinder temperature [° C.] | Mold temperature [° C.] | | Volume resistivity at the time of no light irradiation [Ω · cm] | Volume resistivity at the time of near infrared irradiation [Ω · cm] | | |
| Example 307 | 107 | 170 | 30 | 6.8 | 3.68 × 10$^8$ | 890 | V-0 | 8.5 |
| Example 308 | 108 | 180 | 30 | 5.2 | 22.25 × 10$^8$ | 1850 | V-0 | 2.5 |
| Example 309 | 109 | 180 | 30 | 5.8 | 22.35 × 10$^8$ | 1720 | V-0 | 3.2 |
| Example 310 | 110 | 200 | 60 | 7.2 | 25.36 × 10$^8$ | 2010 | V-1 | 4.8 |
| Example 311 | 111 | 200 | 60 | 7.4 | 24.98 × 10$^8$ | 2020 | V-1 | 5.6 |
| Comparative Example 301 | C101 | 180 | 30 | 3.5 | 1 × 10$^{15}$ or more | 1 × 10$^{15}$ or more | V-Not | 1-8 |
| Comparative Example 302 | C101 | 180 | 110 | 3.1 | 1 × 10$^{15}$ or more | 1 × 10$^{15}$ or more | V-Not | 0.7 |
| Comparative Example 303 | C102 | 180 | 30 | 3.2 | 1 × 10$^{15}$ or more | 1 × 10$^{15}$ or more | V-2 | 2.2 |
| Comparative Example 304 | C102 | 180 | 110 | 2.8 | 1 × 10$^{15}$ or more | 1 × 10$^{15}$ or more | V-2 | 1.4 |

From the above results, it is understood that the resin compositions according to examples express photoconductivity.

From the above results, it is understood that the resin compositions according to Examples 301 to 307 containing condensed phosphoric acid ester as a flame retardant are superior in the Charpy impact strength and the bending rupture elongation and show superior mechanical strength after being molded, compared to the resin compositions according to Examples 308 to 311 containing a flame retardant other than condensed phosphoric acid ester as a flame retardant. Particularly, comparing Example 302 with Example 309, Example 303 with Example 308, Example 305 with Example 311, and Example 306 with Example 310, which have similar composition, difference in the superiority of the Charpy impact strength and the bending rupture elongation is markedly observed.

The details of the materials shown in the respective tables are described herein.

Aliphatic Polyester
Polylactic acid: "TERRAMAC TE2000" manufactured by UNITIKA, LTD.
Polylactic acid: "3051D" manufactured by NatureWorks LLC.
Polyhydroxybutyrate: "Biopol D400G" manufactured by monsanto Japan Limited.
Aliphatic Polyamide
Polyimide 11: "Rilsan" manufactured by ARKEMA.
Aromatic Compound
Example Compound (1) described above: an aromatic compound represented by Formula (1)
Example Compound (2) described above: an aromatic compound represented by Formula (1)
Example Compound (3) described above: an aromatic compound represented by Formula (1)
Example Compound (4) described above: an aromatic compound represented by Formula (1)
Novolac Phenol Resin
A novolac phenol resin A and a novolac phenol resin B are obtained by being synthesized by the following synthesis method.
Novolac Phenol Resin A
Phenol (94 parts by weight), 102.6 parts by weight of sugar, and 5 parts by weight of para-toluenesulfonic acid are put in a reactor including a condenser and a stirring device and allowed to react for 4 hours at a temperature slowly increasing up to 175° C. while being dehydrated under normal pressure. Methyl ethyl ketone (200 parts by weight) is added thereto to dilute the mixture, and the resultant is washed with water. The temperature is increased up to 130° C. under normal pressure and then increased up to 180° C. in a vacuum to perform a dehydration reaction, thereby obtaining 142 parts by weight of a novolac phenol resin A. This resin is confirmed to be a novolac phenol resin by measuring an absorption spectrum by using an infrared absorption spectrum measuring instrument (manufactured by Shimadzu Corporation, TRAffinity-1).

Novolac Phenol Resin B
Phenol (94 parts by weight), 102.6 parts by weight of sugar, 47 parts by weight of pure water, and 0.2 part by weight of concentrated sulfuric acid are put in a reactor including a condenser and a stirring device, followed by stirring at 100° C. for 180 minutes, and then dehydrated under normal pressure. Formalin (37%, 10.5 parts by weight) is gradually added thereto, and the resultant is stirred at 90° C. for 102 minutes. Subsequently, the resultant is neutralized with hydrated lime, followed by a dehydration reaction in a vacuum, thereby obtaining 155 parts by weight of a novolac phenol resin B. This resin is confirmed to be a novolac phenol resin by measuring an absorption spectrum by using an infrared absorption spectrum measuring instrument (manufactured by Shimadzu Corporation, IRAffinity-1).

Crystal Nucleating Agent
Trimeric Acid Tricyclohexylamide: "ECOPROMOTE" manufactured by NISSAN CHEMICAL INDUSTRIES, LTD.
Talc: "MICRO ACE P-8" manufactured by Nippon Talc Co., Ltd.
Condensed Phosphoric Acid Ester
"PX200" manufactured by DAIHACHI CHEMICAL INDUSTRY CO., LTD.: the above-described compound represented by Structural Formula (C)
Flame Retardant
Ammonium polyphosphate: "EXOLIT AP422" manufactured by Clariant Japan The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin compound comprising:
   a reaction product of (A) polymer which is at least selected from aliphatic polyester and aliphatic polyamide and (B) an aromatic compound of which a compositional ratio is from 0.1 part by weight to 10 parts by weight with respect to 100 parts by weight of the Component (A) and which is represented by the following Formula (1):

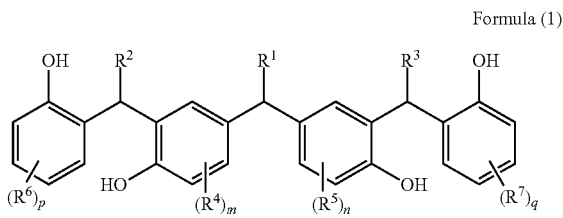

Formula (1)

wherein in Formula (1), each of $R^1$, $R^2$, and $R^3$ independently represents a hydrogen atom, a substituted or unsubstituted alkyl group having from 1 to 6 carbon atoms, or a substituted or unsubstituted aromatic group having from 6 to 10 carbon atoms; each of $R^4$, $R^5$, $R^6$, and $R^7$ independently represents a substituted or unsubstituted alkyl group having from 1 to 6 carbon atoms or a substituted or unsubstituted aromatic group having from 6 to 10 carbon atoms; each of m and n independently represents an integer of from 0 to 3; and each of p and q independently represents an integer of from 0 to 4.

2. The resin compound according to claim 1,
   wherein the aromatic compound is an aromatic compound represented by Formula (1) in which each of $R^1$, $R^2$, and $R^3$ independently represents a substituted or unsubstituted alkyl group having from 1 to 6 carbon atoms; each of m, n, p, and q independently represents an integer of 1 or greater; and each of at least one of the $R^4$s, at least one of the $R^5$s, at least one of the $R^6$s, and at least one of the $R^7$s independently represents a substituted or unsubstituted alkyl group having from 1 to 6 carbon atoms.

3. A resin composition comprising:
   a resin compound containing a reaction product of (A) polymer which is at least selected from aliphatic polyester and aliphatic polyamide and (B) an aromatic compound of which a compositional ratio is from 0.1 part by weight to 10 parts by weight with respect to 100 parts by weight of the Component (A) and which is represented by the following Formula (1):

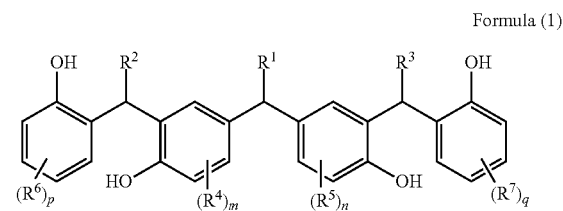

Formula (1)

wherein in Formula (1), each of $R^1$, $R^2$, and $R^3$ independently represents a hydrogen atom, a substituted or unsubstituted alkyl group having from 1 to 6 carbon atoms, or a substituted or unsubstituted aromatic group having from 6 to 10 carbon atoms; each of $R^4$, $R^5$, $R^6$, and $R^7$ independently represents a substituted or unsubstituted alkyl group having from 1 to 6 carbon atoms or a substituted or unsubstituted aromatic group having from 6 to 10 carbon atoms; each of m and n independently represents an integer of from 0 to 3; and each of p and q independently represents an integer of from 0 to 4.

4. The resin composition according to claim 3,
   wherein the aromatic compound is an aromatic compound represented by Formula (1) in which each of $R^1$, $R^2$, and $R^3$ independently represents a substituted or unsubstituted alkyl group having from 1 to 6 carbon atoms; each of m, n, p, and q independently represents an integer of 1 or greater; and each of at least one of the $R^4$s, at least one of the $R^5$s, at least one of the $R^6$s, and at least one of the $R^7$s independently represents a substituted or unsubstituted alkyl group having from 1 to 6 carbon atoms.

5. The resin composition according to claim 3, further comprising condensed phosphoric acid ester.

6. The resin composition according to claim 4, further comprising condensed phosphoric acid ester.

7. A resin-molded article comprising:
   a resin compound containing a reaction product of (A) polymer which is at least selected from aliphatic polyester and aliphatic polyamide and (B) an aromatic compound of which a compositional ratio is from 0.1 part by weight to 10 parts by weight with respect to 100 parts by weight of the Component (A) and which is represented by the following Formula (1):

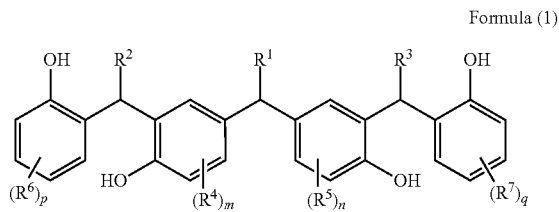

Formula (1)

wherein in Formula (1), each of $R^1$, $R^2$, and $R^3$ independently represents a hydrogen atom, a substituted or unsubstituted alkyl group having from 1 to 6 carbon atoms, or a substituted or unsubstituted aromatic group having from 6 to 10 carbon atoms; each of $R^4$, $R^5$, $R^6$, and $R^7$ independently represents a substituted or unsubstituted alkyl group having from 1 to 6 carbon atoms or a substituted or unsubstituted aromatic group having from 6 to 10 carbon atoms; each of m and n independently represents an integer of from 0 to 3; and each of p and q independently represents an integer of from 0 to 4.

8. The resin-molded article according to claim 7,
   wherein the aromatic compound is an aromatic compound represented by Formula (1) in which each of $R^1$, $R^2$, and $R^3$ independently represents a substituted or unsubstituted alkyl group having from 1 to 6 carbon atoms; each of m, n, p, and q independently represents an integer of 1 or greater; and each of at least one of the $R^4$s, at least one of the $R^5$s, at least one of the $R^6$s, and at least one of the $R^7$s independently represents a substituted or unsubstituted alkyl group having from 1 to 6 carbon atoms.

9. The resin-molded article according to claim 7, further comprising condensed phosphoric acid ester.

10. The resin-molded article according to claim 8, further comprising condensed phosphoric acid ester.

11. The resin-molded article according to claim 7 that is molded by injection molding.

12. The resin-molded article according to claim 8 that is molded by injection molding.

13. The resin-molded article according to claim 9 that is molded by injection molding.

14. The resin-molded article according to claim 10 that is molded by injection molding.

* * * * *